(12) United States Patent
Heth et al.

(10) Patent No.: US 11,707,970 B2
(45) Date of Patent: Jul. 25, 2023

(54) AIR VENT AND MOTOR VEHICLE

(71) Applicant: Dr. Ing. h.c. F. Porsche Aktiengesellschaft, Stuttgart (DE)

(72) Inventors: Marc-Lieven Heth, Karlsruhe (DE); Andreas Schneider, Calw (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 345 days.

(21) Appl. No.: 16/930,327

(22) Filed: Jul. 16, 2020

(65) Prior Publication Data

US 2021/0023913 A1 Jan. 28, 2021

(30) Foreign Application Priority Data

Jul. 22, 2019 (DE) .................. 10 2019 119 732.5

(51) Int. Cl.
*B60H 1/34* (2006.01)
*F24F 13/065* (2006.01)
*B60H 1/00* (2006.01)

(52) U.S. Cl.
CPC ....... *B60H 1/3428* (2013.01); *B60H 1/00514* (2013.01); *B60H 1/00871* (2013.01); *B60H 1/3442* (2013.01); *B60H 2001/3471* (2013.01)

(58) Field of Classification Search
CPC .............. B60H 1/3428; B60H 1/00514; B60H 1/00871; B60H 1/3442; B60H 2001/3471; B60H 2001/3464; F24F 13/065
USPC ......................................... 454/155, 154, 286
See application file for complete search history.

(56) References Cited

U.S. PATENT DOCUMENTS

| 4,006,673 A * | 2/1977 | Meyer ................... F24F 13/065 454/154 |
| 6,074,295 A | 6/2000 | Volk |
| 2002/0142715 A1 | 10/2002 | Rooney et al. |
| 2008/0171509 A1 | 7/2008 | Grossmann et al. |
| 2014/0342657 A1 | 11/2014 | Rais et al. |
| 2015/0202946 A1* | 7/2015 | Inagaki ................ B60H 1/3442 454/154 |
| 2016/0089959 A1* | 3/2016 | Bouldron ................ F24F 13/10 454/155 |
| 2017/0326951 A1* | 11/2017 | Frenzel ................ B60H 1/3428 |
| 2017/0341488 A1* | 11/2017 | Kim ..................... B60H 1/0065 |

FOREIGN PATENT DOCUMENTS

| DE | 6811796 U | 5/1969 |
| DE | 19851490 A1 | 5/2000 |
| DE | 19745932 C2 | 5/2001 |
| DE | 102005035768 A1 | 2/2006 |
| DE | 102005035248 A1 | 2/2007 |
| DE | 102008002958 B3 | 10/2009 |
| DE | 102012006339 A1 | 11/2012 |
| DE | 102013206873 A1 | 10/2014 |

(Continued)

*Primary Examiner* — Steven B McAllister
*Assistant Examiner* — Cole N Friedman
(74) *Attorney, Agent, or Firm* — Leydig, Voit & Mayer, Ltd.

(57) ABSTRACT

An air vent for a motor vehicle includes a housing with an air channel for feeding air and a partial hemisphere shell. The partial hemisphere shell is mounted in a rotatable manner within the housing such that air fed through the air channel is deflected on the housing before it exits from the air vent.

9 Claims, 10 Drawing Sheets

(56) References Cited

FOREIGN PATENT DOCUMENTS

| | | | |
|---|---|---|---|
| FR | 2827815 | A1 | 1/2003 |
| JP | S 60256747 | A | 12/1985 |
| JP | 2002071204 | A | 3/2002 |
| JP | 2009502609 | A | 1/2009 |

* cited by examiner

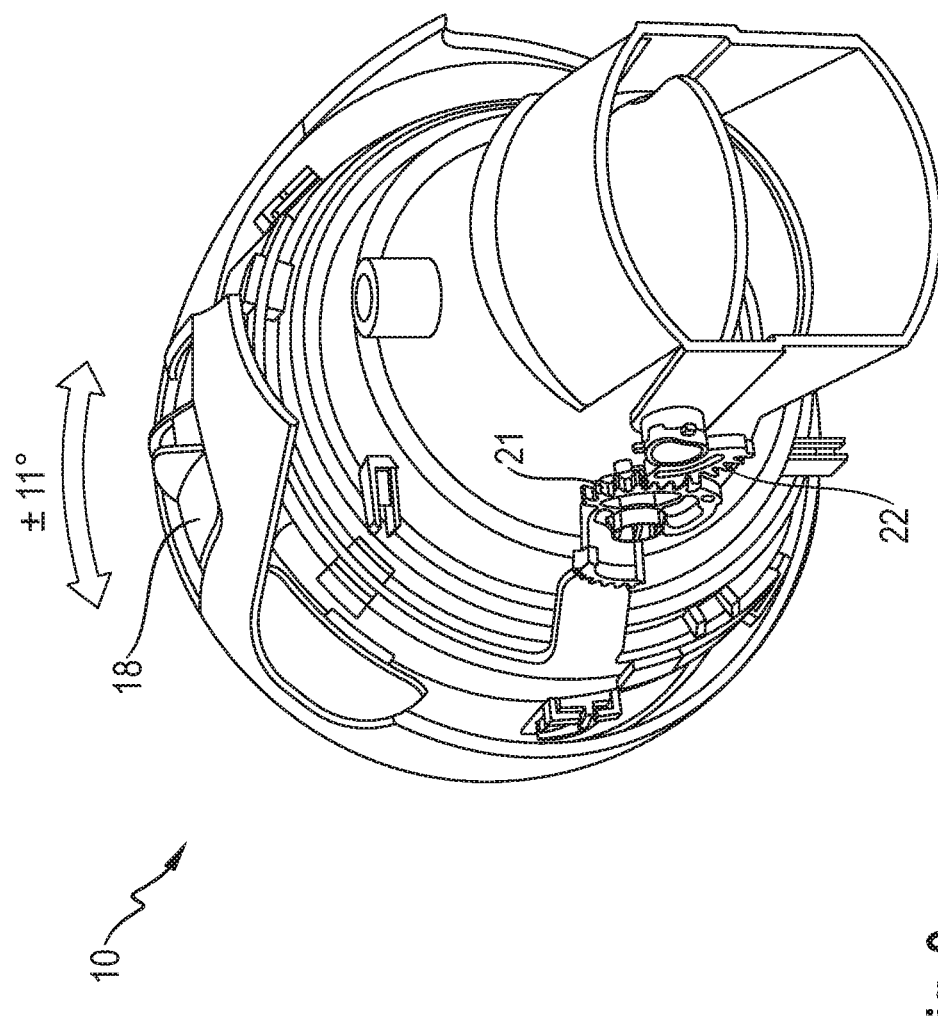

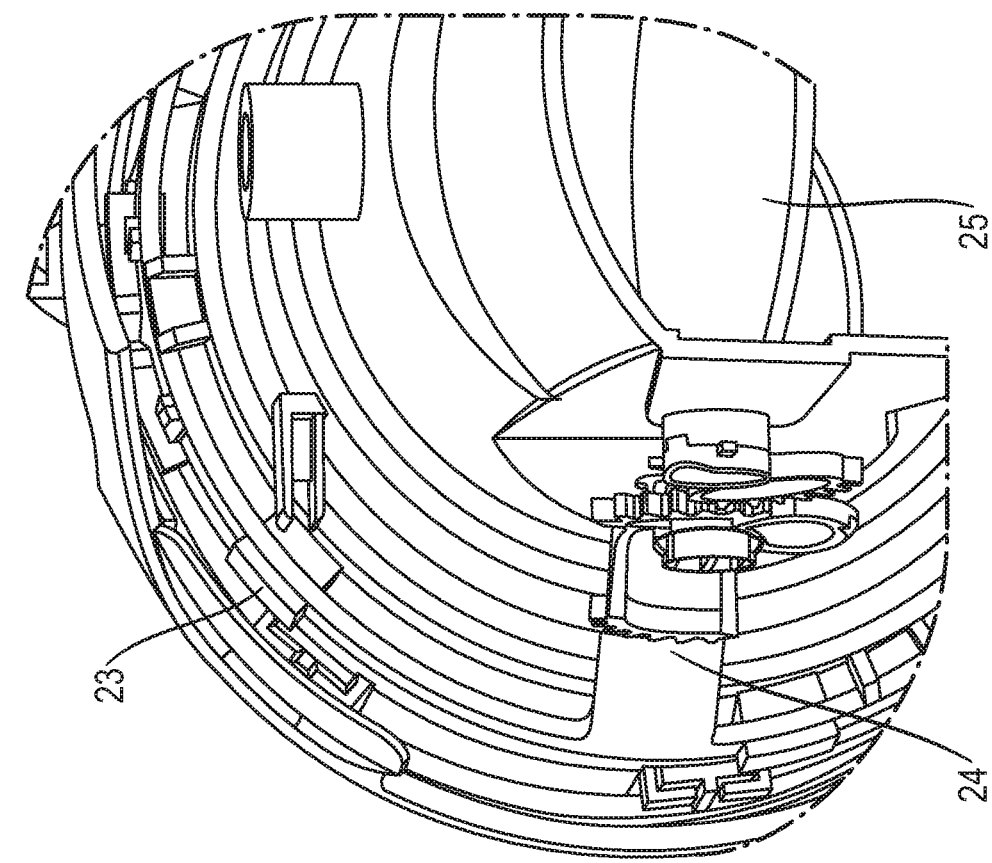

AIR VENT AND MOTOR VEHICLE

CROSS-REFERENCE TO PRIOR APPLICATIONS

This application claims benefit to German Patent Application No. DE 10 2019 119 732.5, filed on Jul. 22, 2019, the entire disclosure of which is hereby incorporated by reference herein.

FIELD

The present invention relates to an air vent for a motor vehicle. The present invention also relates to a corresponding motor vehicle.

BACKGROUND

In automotive engineering, air vents are generally understood to be the air distributors and air nozzles for a wide variety of different air channels in or beneath the dashboard, in the so-called ventilation or air-conditioning roof lining and also behind or beneath the seats of a motor vehicle.

It is known from DE10 2008 002 958 B3 to provide two hollow-cylinder inserts, which can be moved relative to one another, in order to alter the air-outflow direction.

An actuation of air vents is known from DE 197 45 932 C2, DE10 2005 035 768 A1 and FR2827815A1.

SUMMARY

In an embodiment, the present invention provides an air vent for a motor vehicle. The air vent includes a housing with an air channel for feeding air and a partial hemisphere shell. The partial hemisphere shell is mounted in a rotatable manner within the housing such that air fed through the air channel is deflected on the housing before it exits from the air vent.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 9 shows a perspective view of the air vent as seen obliquely from the rear; and FIG. 10 shows a detail of FIG. 9.

DETAILED DESCRIPTION

The disclosure describes an air vent for a motor vehicle and also a motor vehicle having such an air vent.

Air vents described herein provide for operation that is intuitive, in a manner comparable with conventional louvered air vents and round or spherical air vents, while the shaping of the air vent of the invention differentiates it from conventional air vents.

Figure 1:
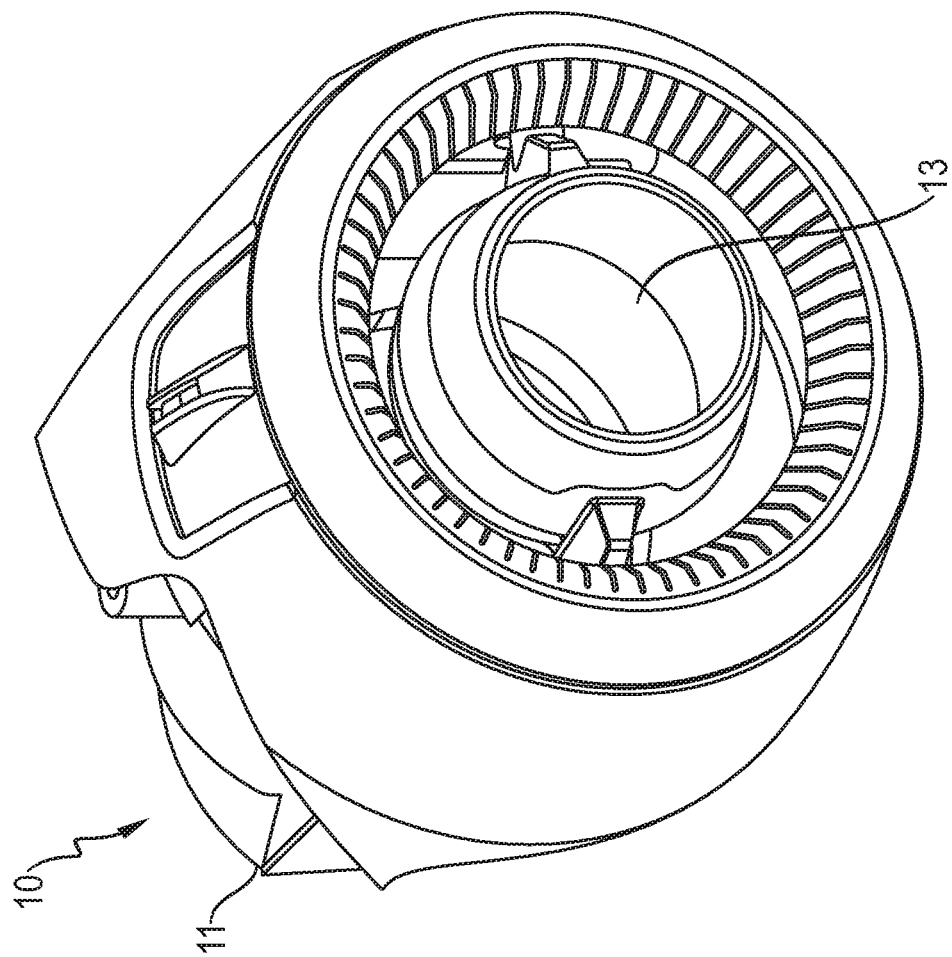
FIG. 1 shows an isometric view of an air vent in a starting position.

FIG. 1 illustrates basic design features of an air vent (10) on the basis of the starting position thereof. The figure shows the housing (11), which accommodates the air channel and on the front side of which is arranged a first operating part (13), which at first glance appears to be conventional.

Figure 2:
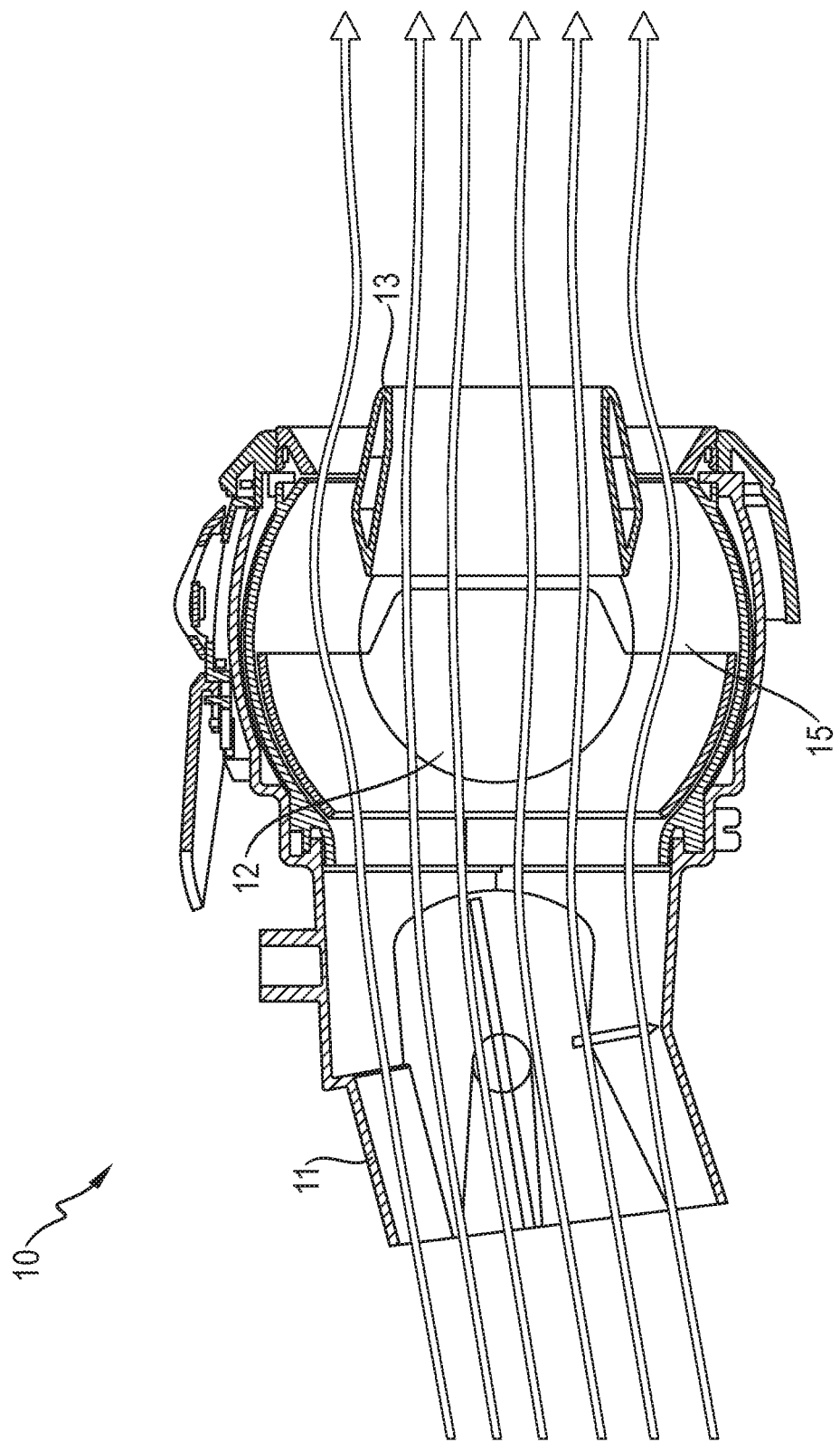
FIG. 2 shows a longitudinal section through the air vent in the starting position.

As FIG. 2 depicts, a spherical housing (15) is arranged within the housing (11), between the air channel and first operating part (13), and, for its part, bears a partial hemisphere shell (12), which serves, in particular, to adjust the angle of distribution.

Figure 3:
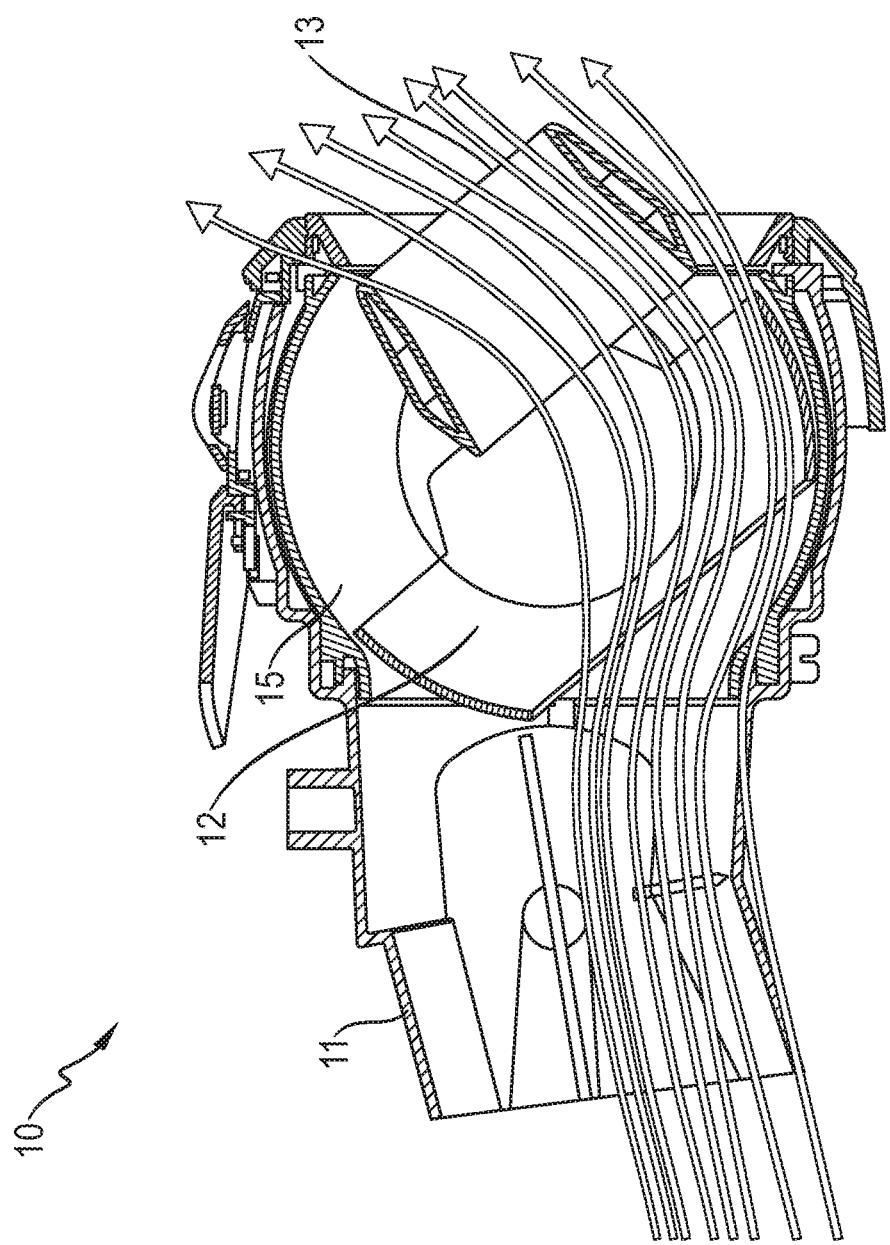
FIG. 3 shows a section corresponding to FIG. 2, with the air vent directed upward at an angle of 40°.
Figure 4:
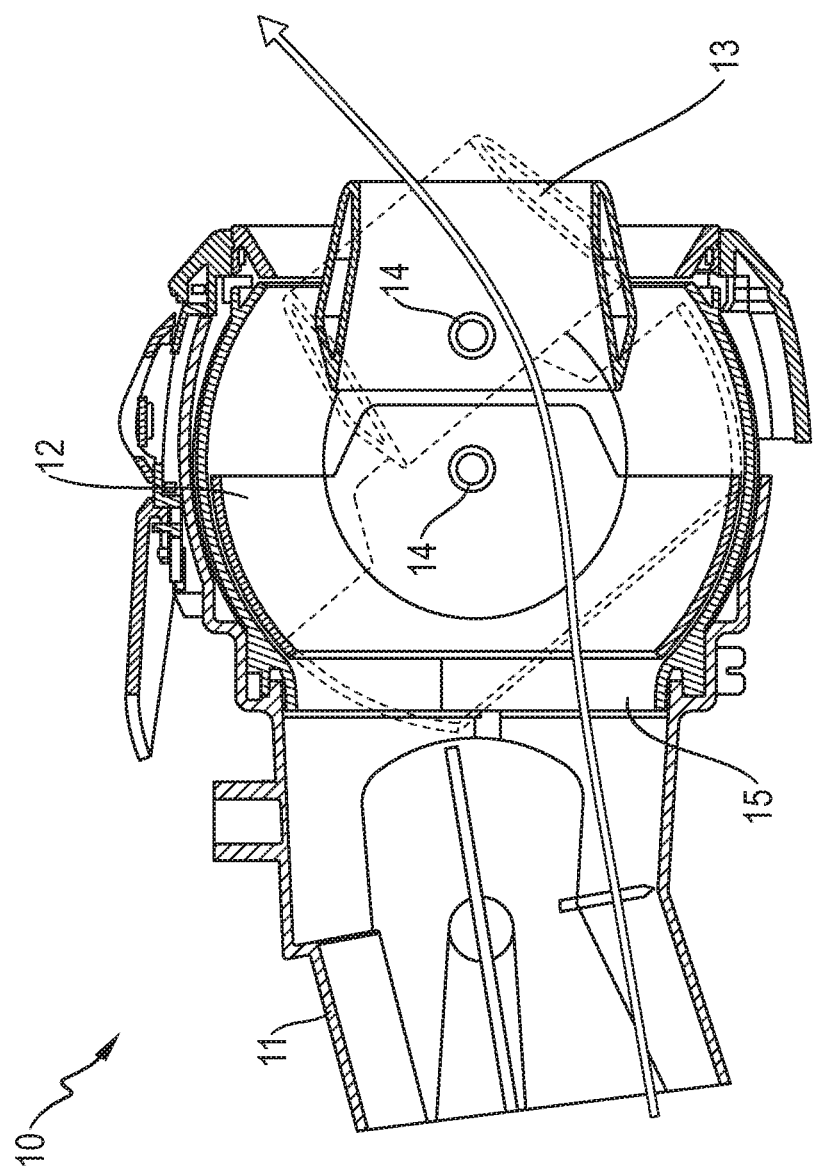
FIG. 4 shows a partially transparent side view of the air vent as seen from the left in the position according to FIG. 3.
Figure 5:
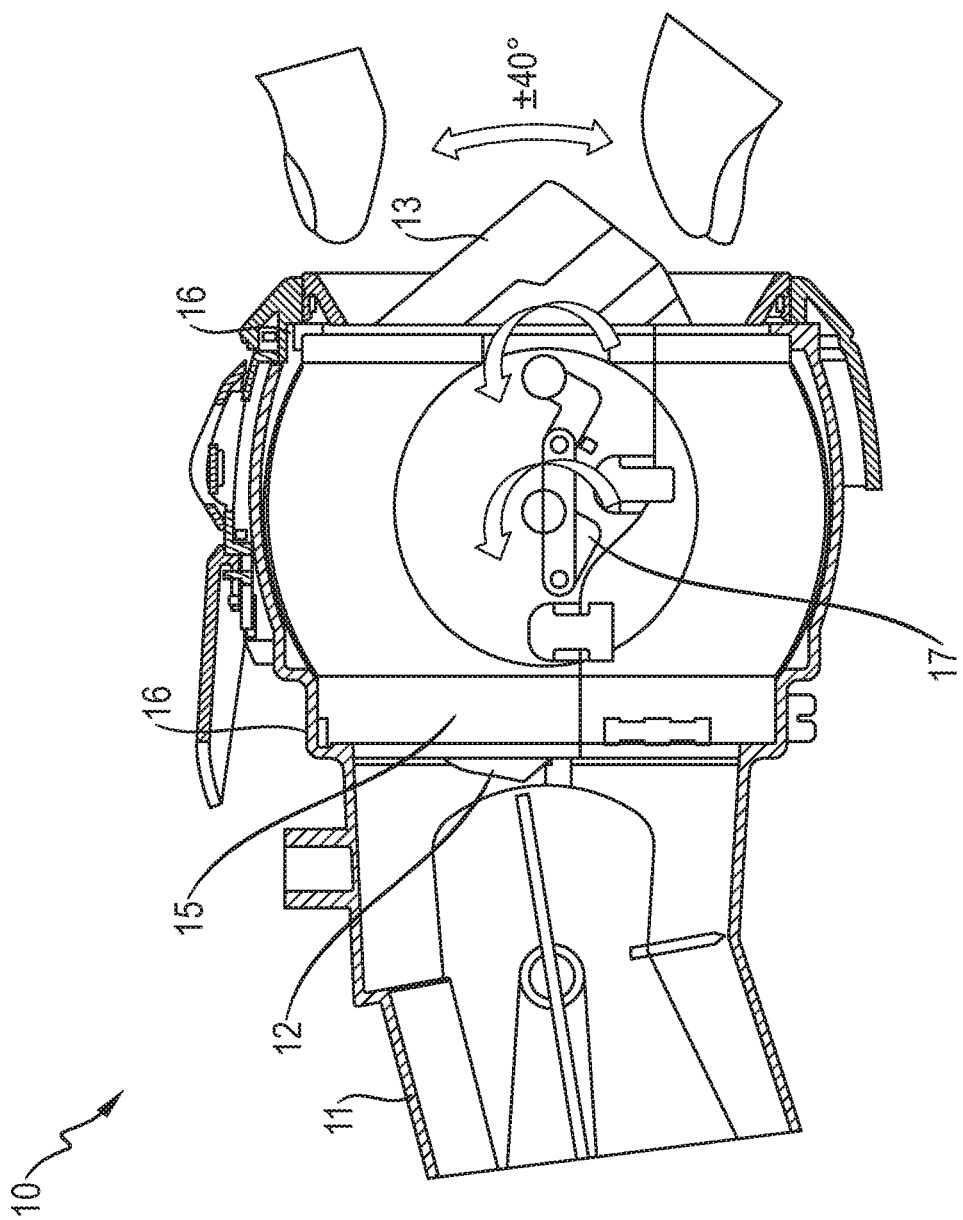
FIG. 5 shows a view corresponding to FIG. 4, with the spherical housing represented in full.

The principle of this distribution will now be explained by looking at FIGS. 3, 4 and 5 together. In this illustration, the thumb and forefinger (see FIG. 5) have been used to pivot the operating part through an angle of 40°, about its axis of rotation (14—FIG. 4), according to the figure in the upward direction. The partial hemisphere shell (12), which is arranged behind the first operating part (13), as seen from the front, is carried along in the same direction of rotation, with a transmission ratio of 1:1, by means of an externally located push-rod linkage (17— FIG. 5). The air stream, which is partially blocked in this way, is thus deflected onto the outer wall of the spherical housing (15) and flows against the cylindrical operating part (13) at the desired angle of distribution. The housing comprises a radial bearing (16).

Figure 6:
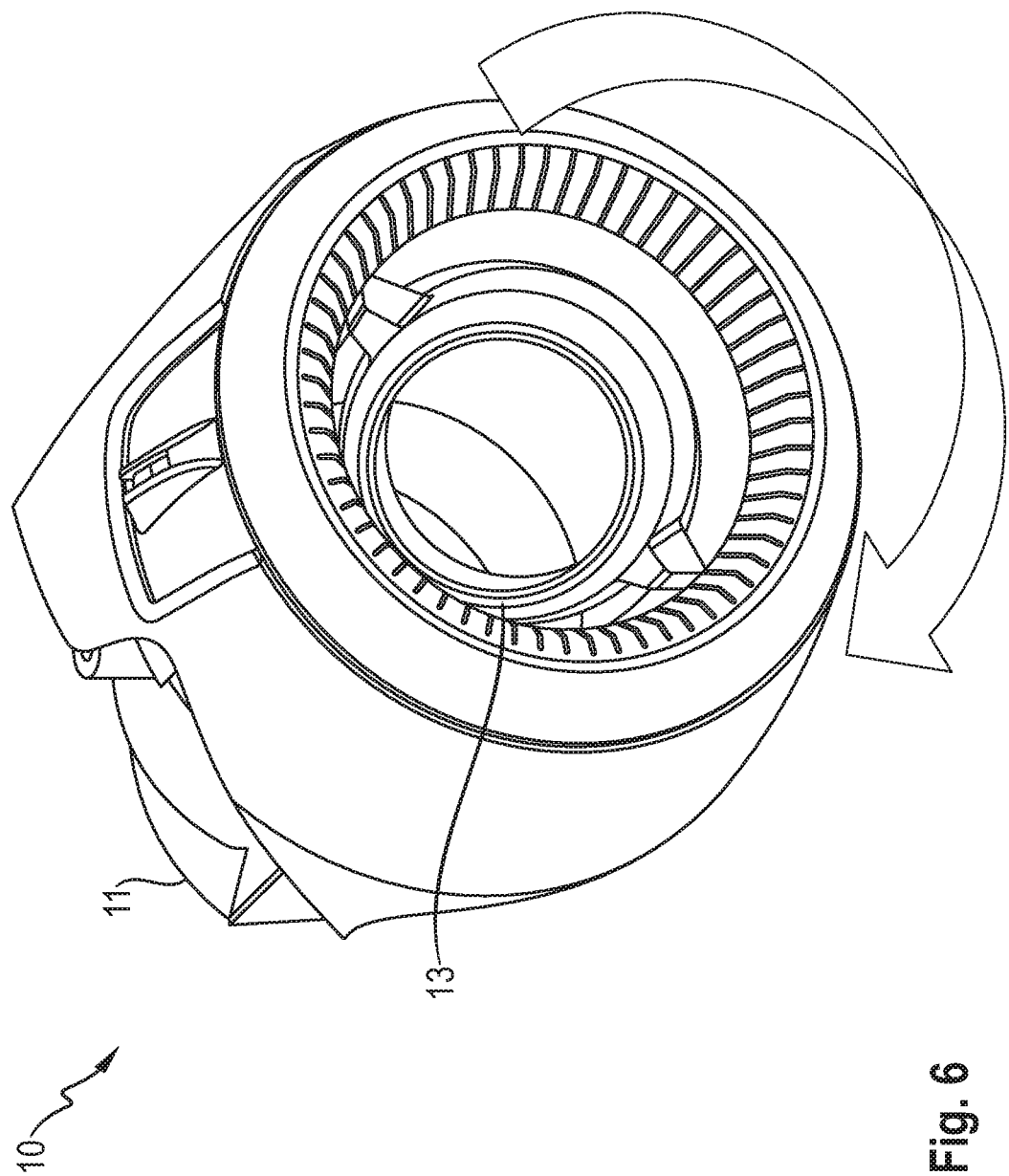
FIG. 6 shows a view corresponding to FIG. 1, with the air vent rotated to the left.
Figure 7:
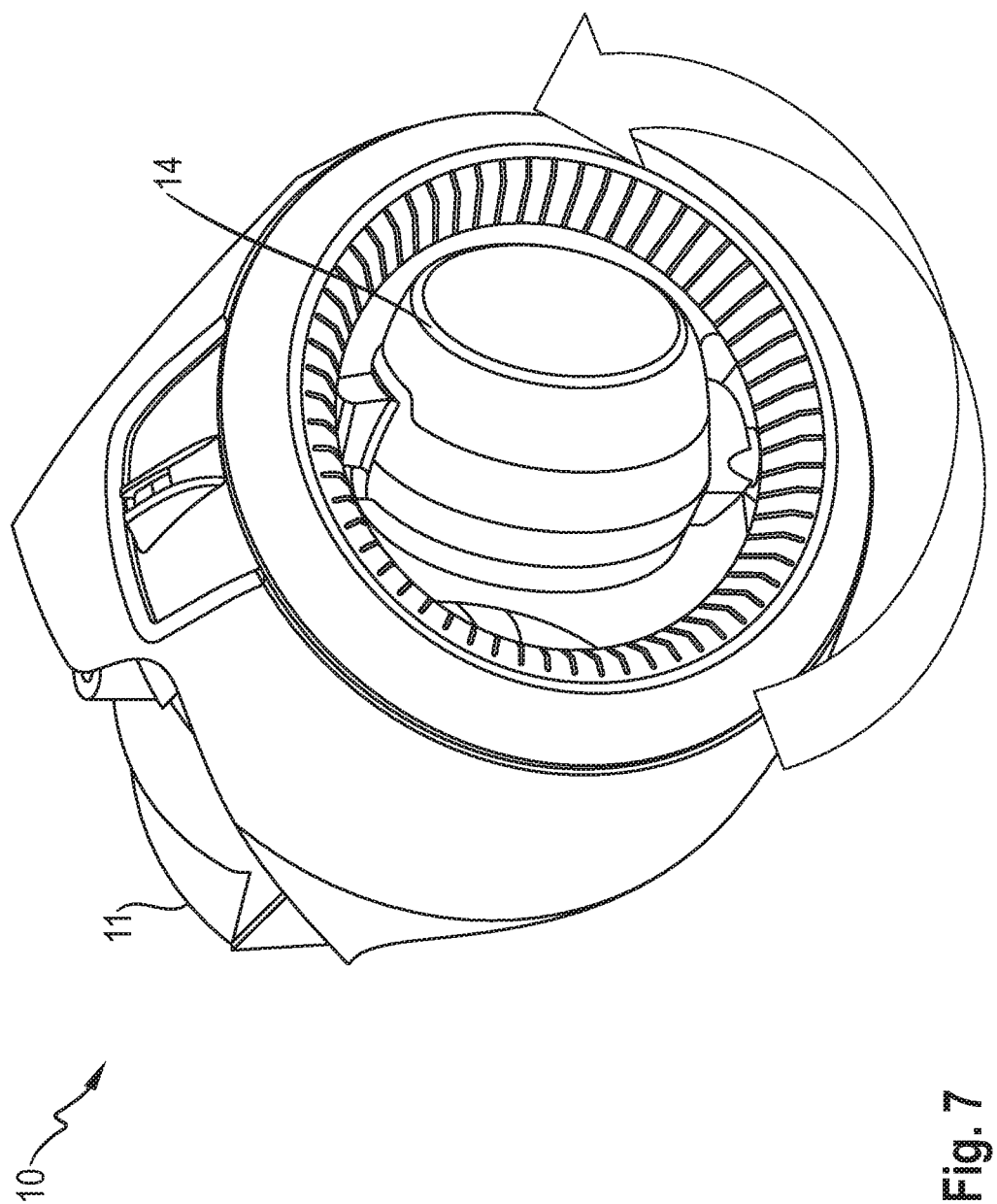
FIG. 7 shows a view corresponding to FIG. 1, with the air vent rotated to the right.

If the first operating part (13) is additionally rotated in the clockwise direction (see FIG. 6) or counterclockwise direction (FIG. 7), as seen from the front, this being possible full circle if no stop (23— FIG. 10) is provided, the previously set deflecting angle can thus be adjusted in each direction.

Figure 8:
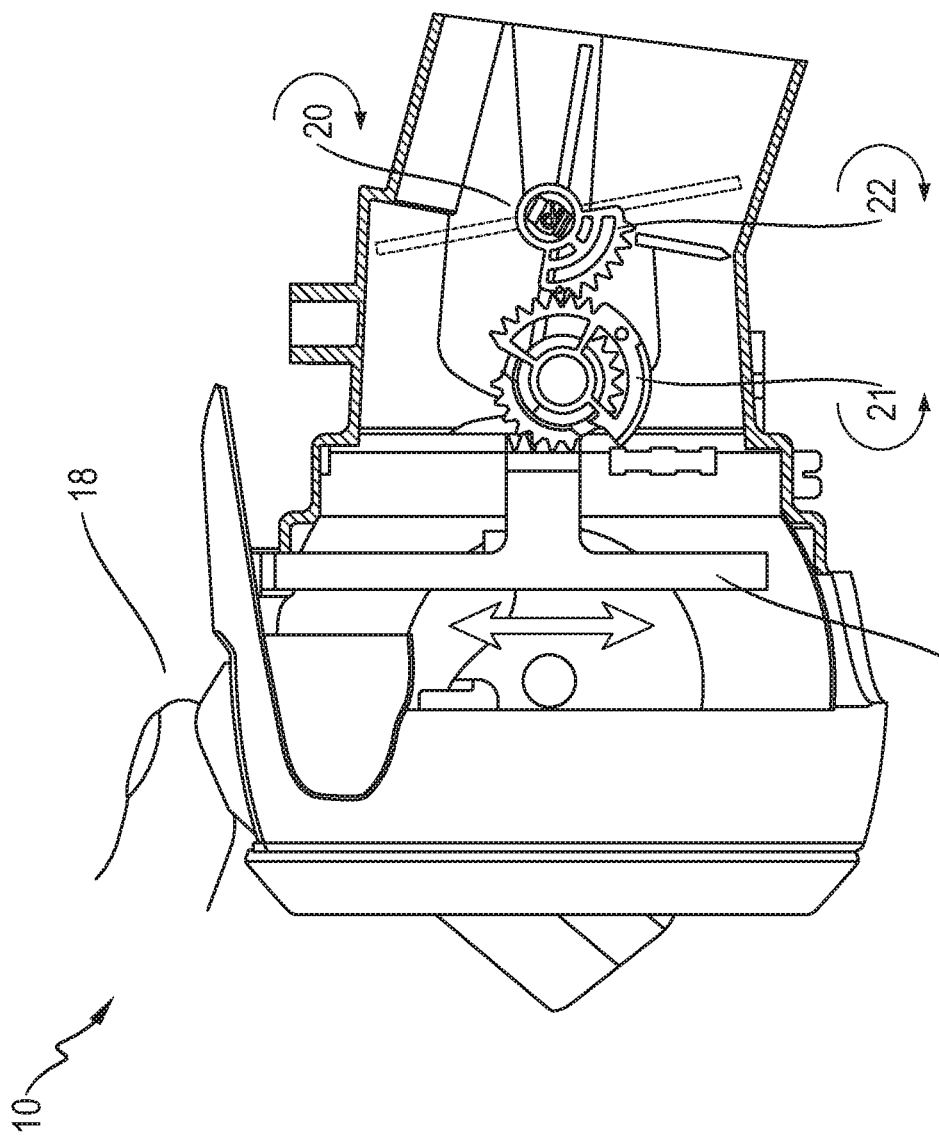
FIG. 8 shows a side view as seen from the right of the air vent with a cover plate, coupling ring, gearwheels and metering flap.

The cinematic air-quantity-metering function will be described, herein below, with reference to FIGS. 8, 9 and 10. For this purpose, the air vent (10) has a metering flap (20— FIG. 8, 25— FIG. 10), which can be finger-operated by way of a second operating part (18). The metering flap (20, 25) is closed by rotation of the second operating part (18) in the clockwise direction, whereas rotation in the counterclockwise direction—as seen from the front in each case—swings round the metering flap (20, 25) into its fully open position (25).

For this purpose, the second operating part (18) is guided by a cover plate. The latter is connected to a coupling ring (19). The rack (24) on the coupling ring (19) drives a first gearwheel (21). A second gearwheel (22) opens (25— FIG. 10) or closes (20— FIG. 8) the metering flap (20, 25), depending on operation. In an alternative embodiment, transmission is possible, without departing from the framework of the invention, by means of coupling rods rather than gearwheels (21, 22).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An air vent for a motor vehicle, comprising:
   a first housing accommodating an air channel with an air flow direction;
   a spherical housing arranged within the first housing;
   a partial hemisphere shell mounted in a rotatable manner within the spherical housing;
   a cylindrical first operating part mounted downstream, in the air flow direction, from the partial hemisphere shell; and
   a push-rod linkage that couples the partial hemisphere shell to the cylindrical first operating part,
   wherein the first operating part is configured to undergo a pivot movement about a first axis of rotation and the push-rod linkage is configured to transmit the pivot movement of the first operating part to the partial hemisphere shell such that the partial hemisphere shell undergoes, as a result of the pivot movement of the first operating part, a pivot movement about a second axis of rotation parallel to and spaced from the first axis of rotation,
   wherein the pivot movement of the partial hemisphere shell is configured to bring an interior portion of the partial hemisphere shell into an air flow such that the portion of the partial hemisphere shell deflects air fed through the air channel before the air exits from the air vent, and
   wherein the first axis of rotation and the second axis of rotation extend perpendicular to the air flow direction.

2. The air vent as claimed in claim 1, wherein the first housing includes a radial bearing that bears the spherical housing.

3. The air vent as claimed in claim 1, further comprising:
   a second operating part;
   a coupling ring; and
   a metering flap configured to meter the flow of air fed through the air channel,
   wherein the coupling ring couples the metering flap to the second operating part.

4. The air vent as claimed in claim 3, further comprising:
   a rack formed on the coupling ring;
   a first gearwheel; and
   a second gearwheel,
   wherein the metering flap is coupled to the second operating part via the rack, the first gearwheel, and the second gearwheel in addition to the coupling ring.

5. The air vent as claimed in claim 4, wherein the second operating part is configured to rotate the coupling ring about a third axis of rotation, and wherein rotation of the coupling ring transmits a force, via the rack, the first gearwheel, and the second gearwheel, to the metering flap that causes the metering flap to undergo a pivot about a fourth axis of rotation, the fourth axis of rotation being perpendicular to the air flow direction.

6. The air vent as claimed in claim 5, wherein the third axis of rotation is perpendicular to the first, second, and fourth axes of rotation.

7. The air vent as claimed in claim 3, further comprising coupling rods, wherein the metering flap is coupled to the second operating part via the coupling rods.

8. The air vent as claimed in claim 3, wherein the metering flap is coupled to the second operating part such that rotation of the coupling ring through an acute angle swings round the metering flap between a closed position and an open position.

9. A motor vehicle, comprising:
   at least one air vent as claimed in claim 1.

* * * * *